United States Patent
Van Nuffel

(10) Patent No.: US 6,441,071 B1
(45) Date of Patent: Aug. 27, 2002

(54) POLYCARBONATE RESIN COMPOSITIONS COMPRISING CYANACRYLIC ACID ESTER STABILIZER COMPOUNDS

(75) Inventor: Claude T. E. Van Nuffel, Oostakker (BE)

(73) Assignee: Dow Global Technologies Inc., Midland, MI (US)

( * ) Notice: Subject to any disclaimer, the term of this patent is extended or adjusted under 35 U.S.C. 154(b) by 15 days.

(21) Appl. No.: 09/634,674

(22) Filed: Aug. 8, 2000

Related U.S. Application Data
(60) Provisional application No. 60/152,010, filed on Sep. 1, 1999.

(51) Int. Cl.[7] .............................. C08K 5/16; C08K 5/15; C08K 5/51
(52) U.S. Cl. ...................... 524/316; 524/209; 524/111; 524/128; 524/151; 524/153
(58) Field of Search .................................. 524/209, 316, 524/111, 128, 151, 153

(56) References Cited

U.S. PATENT DOCUMENTS

| | | |
|---|---|---|
| 3,043,709 A | 7/1962 | Amborski |
| 3,215,725 A | 11/1965 | Strobel et al. |
| 3,309,220 A | 3/1967 | Osteen |
| 4,264,680 A | 4/1981 | Anthony |
| 4,325,863 A | 4/1982 | Hinsken et al. |
| 4,353,965 A | 10/1982 | Olson et al. |
| 4,366,207 A | 12/1982 | Anthony |
| 4,668,588 A | 5/1987 | Kishima |
| 4,812,498 A | 3/1989 | Nakahara et al. |
| 4,861,664 A | 8/1989 | Goossens et al. |
| 4,937,026 A | 6/1990 | Goossens et al. |
| 5,108,835 A | 4/1992 | Hähnsen et al. |
| 5,175,312 A | 12/1992 | Dubs et al. |
| 5,216,052 A | 6/1993 | Nesvadba et al. |
| 5,252,643 A | 10/1993 | Nesvadba |
| 5,288,778 A | 2/1994 | Schmitter et al. |
| 5,356,966 A | 10/1994 | Nesvadba |
| 5,367,008 A | 11/1994 | Nesvadba |
| 5,369,159 A | 11/1994 | Nesvadba |
| 5,428,162 A | 6/1995 | Nesvadba |
| 5,428,177 A | 6/1995 | Nesbadba |
| 5,488,177 A | 1/1996 | Appel et al. |
| 5,821,380 A | 10/1998 | Holderbaum et al. |

FOREIGN PATENT DOCUMENTS

| | | |
|---|---|---|
| BE | 672293 | 5/1966 |
| EP | 068327 | 9/1985 |
| EP | 110221 | 4/1987 |
| EP | 320632 | 11/1992 |
| EP | 338355 | 11/1992 |
| EP | 247480 | 6/1993 |
| EP | 900782 | 3/1999 |
| EP | 825226 | 4/2000 |
| GB | 2290745 | 1/1996 |
| GB | 2322861 | 9/1998 |
| JP | 04-159354 | 6/1992 |
| JP | 07-9560 | 1/1995 |
| JP | 04-103626 | 8/1997 |
| JP | 10-044356 | 2/1998 |
| JP | 10-044357 | 2/1998 |
| JP | 10-044358 | 2/1998 |
| JP | 10-138435 | 5/1998 |

Primary Examiner—Kriellion A. Sanders

(57) ABSTRACT

Improved polycarbonate resins are prepared comprising specific amounts of a cyanacrylic acid ester type UV absorber in combination with a synergistic phosphite type stabilizer and, optionally, a hindered phenol type stabilizer and/or a lactone type stabilizer. The polycarbonate compositions according to the invention can be used to prepare molded, shaped or otherwise fabricated articles having improved combinations of protection against UV radiation, color and color stability with reduced plate-out behavior during processing. The compositions are especially suitable for use in extrusion, blow molding, thermoforming, injection molding, injection blow molding, injection compression molding, film blow molding and foaming processes and provide improved parts or articles.

7 Claims, No Drawings

POLYCARBONATE RESIN COMPOSITIONS COMPRISING CYANACRYLIC ACID ESTER STABILIZER COMPOUNDS

This application claims the benefit of U.S. Provisional Application No. 60/152,010 filed Sep. 1, 1999.

Polycarbonate resins offer an excellent balance of properties with respect to transparency, toughness, dimensional stability and heat resistance. These properties make polycarbonate an ideal choice for the preparation of many types of molded, shaped or otherwise fabricated articles, especially including sheets or other structures and parts to be used in glazing and other outdoor applications. However, polycarbonates, like most organic polymers, degrade when they are exposed to ultraviolet light. As the polycarbonate absorbs significant amounts of high energy light and begins to degrade, it is known to become yellow and hazy and lose its toughness. Since polycarbonates derive much of their value and utility from their excellent optical properties, i.e. low color and high clarity, protection against UV becomes vital.

The use of various types of UV absorbers in the stabilization of polymers is well known. See for example U.S. Pat. No. 3,215,725 (bis cyano-diphenyl-acrylic acid esters); U.S. Pat. No. 4,812,498 (bis benzotriazoles); U.S. Pat. No. 5,288,778; GB Patent 2,290,745 and EP 825,226 (triazine compounds); U.S. Pat. No. 5,821,380 (multifunctional 2-cyanoacrylic esters); EP 68,327 (cyclic imino esters also referred to benzoxazinones) and EP 110, 221 (benzophenones and benzotriazoles). These stabilizers function by absorbing incident UV radiation and dispersing the absorbed energy in a nondestructive manner. Their overall effectiveness in preventing UV degradation of the polymer depends on numerous factors, including absorptivity, compatibility, stability and distribution within the polymer. Their UV absorption effectiveness is a function of their concentration in the polymer, especially near the surface. Concentration of the UV absorber near the surface of the polymer is very desirable to prevent penetration of UV light is considered to be more efficient and economical than dispersion of the UV absorber throughout the bulk of the polymer.

It is critical, therefore, for effective UV stabilization of polymers to have effective concentrations of UV absorbers present near the surface after processing and during long term. Both chemical and physical losses of the UV absorber will affect the concentration of UV absorbers in polymers. Chemical losses result from the thermal, photo-oxidative and oxidative reactions that inactivate or consume the compounds themselves. Physical loss of the UV-absorber involves the removal of material from the surface by evaporation or dissolution that is not offset by its replacement in the surface layer by diffusion from the bulk polymer When UV-absorbers are physically lost from polymers, this may lead to undesired effects, such as fuming and plate-out in sheet extrusion or juicing and mould sweat during injection molding. All of these phenomena will result in reduced UV absorber concentrations in the resin and reduced production rates due to frequent, necessary cleaning operations of the equipment. Improved retention of a UV-absorber conversely provides more effective stabilization in the desired end use as well as better processability in terms of reduced fuming, plate-out, mould sweat, juicing, etc.

Various methods have been used to improve the UV-stability of polycarbonate. Common approaches are to use UV-absorbers as additives in the polycarbonate and to apply surface layers or other surface treatments to prepare structures where the UV absorbers can be concentrated in the surface or outer layers to prevent UV radiation from deeper penetration into and degradation of the main thickness of the PC sheet. A number of methods and techniques have been developed to concentrate UV absorbers near or at the surface of polymeric materials. These include surface impregnation (see for example U.S. Pat. Nos. 3,309,220; 3,043,709; 4,861,664 and 4,937,026); coating a plastic article with solutions containing thermoplastic resins and UV absorbers (see for example U.S. Pat. Nos. 4,668,588 and 4,353,965); thermal bonding of film layers (see for example JP 07-9,560); and coextrusion (see for example European Patent Publications EP 110,221, EP 247,480, EP 320,632, EP 338,355 and EP 825,226; GB Patent 2,290,745 and U.S. Pat. Nos. 4,264,680 and 5,108,835). In these and other coextrusion references, there is an emphasis on the use of higher molecular weight and lower volatility compounds if used in higher concentrations in coextruded surface layers.

It is also generally known to incorporate additional stabilizers of various other types into polycarbonate compositions to prevent discoloration of the polymer and the final article during processing and end-use. U.S. Pat. Nos. 4,812,498, 5,288,778 and 5,821,380 and GB Patent 2,290, 745 all teach the use of numerous co-stabilizers. The use of phosphite stabilizers in combination with a triazine-type UV absorber has been described in EP 825,226. JP 10-044,356; JP 10-044,357; and JP 10-044,358 teach the use of a combination of triazine-type UV absorber, phosphite and hindered phenolic stabilizers added or applied to polycarbonate resins. JP 04-103,626; JP 04-159,354 and JP 10-138, 435 teach the use of a combination of benzotriazole-type UV absorber, phosphite and hindered phenolic stabilizers added or applied to polycarbonate resins. GB Patent 2,322,861 teaches the stabilization of polycarbonates with benzofuran-2-one lactone-type additives optionally employing a wide range of additional co-stabilizers of various different types. However, in the case of polycarbonate formulations and especially co-extrudable compositions, which contain high levels of UV absorbers, it is always desirable to have improved combinations of physical, processing and appearance properties. It is especially desirable to have such improved resins, improved stabilized articles and improved processes where the stabilizers volatilize less and are better maintained in the compositions and articles during and after processing.

It is thus the objective of the present invention to provide improved polycarbonate compositions and improved molded, shaped or otherwise fabricated articles having appropriate UV protection (physical property and appearance stability) for outdoor applications. It is also an objective to provide improved processes for the preparation of these improved molded, shaped or otherwise fabricated articles.

In one embodiment, this invention relates to a polycarbonate resin composition comprising a polycarbonate, a cyanacrylic acid ester compound having a molecular weight of at least 500 g/mol and a phenyl phosphite type stabilizer. In another embodiment, the polycarbonate resin further comprises a hindered phenol type stabilizer and preferably, also a lactone type stabilizer. Preferably such polycarbonate resin compositions comprise from 0.05 to 15 weight percent cyanacrylic acid ester type UV absorber, 20 to 1500 ppm phosphite type stabilizer, from 10 to 750 ppm hindered phenol type stabilizer and from 5 to 400 ppm lactone type stabilizer. Polycarbonate resin composition according to the invention desirably comprise at least about 2 percent by weight cyanacrylic acid ester compound based on weight of polycarbonate and advantageously are used in surface layers or otherwise applied to the surface of articles, preferably polycarbonate articles.

In a preferred, alternative embodiment, the polycarbonate resin compositions comprise a cyanacrylic acid ester compound according to the following formula:

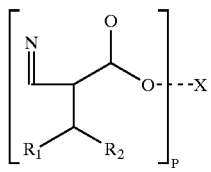

where the $R_1$ and $R_2$ substituents are each hydrogen or a radical having an iso- or heterocyclic ring system with at least one iso- or heteroaromatic nucleus, and at least one of the radicals $R_1$ or $R_2$ must be different from hydrogen; p has an average value of at least 3; X is the radical of an aliphatic or cycloaliphatic polyol having from about 3 to about 20 carbon atoms and at least p hydroxyl groups, a cycloaliphatic radical optionally containing 1 or 2 hetero atoms, and an aliphatic radical optionally being interrupted by up to 8 non-adjacent oxygen atoms, sulfur atoms, imino or $C_1$–$C_4$-alkylimino groups.

In another embodiment, this invention is an article molded, shaped or otherwise fabricated from a resin composition as described above. In other embodiments, these types of resin compositions are found to provide improved molded, shaped or otherwise fabricated articles of many types including extruded sheet structures and articles or structures which have been blow molded, thermoformed, injection molded, injection blow molded, injection compression molded, foamed or film blow molded.

It has been found that the improved resin compositions and the improved articles which can be prepared have excellent resistance against UV radiation and provide improved combinations of base color, color stability (thermal stability) and other physical properties including particularly improved cracking resistance and surface properties. It has also been found that the UV absorber and added stabilizer(s) added according to the present invention provide reduced levels of color or yellowing in the final polycarbonate compositions/articles. This can be particularly noticeable in the resin granules when high levels of UV absorbers are incorporated in a resin to be used as the coextrudable surface layer or when there are multiple thickness of extruded sheet or other article that is stacked or lined up together.

It has also been found that in a further embodiment, the invention provides improved processes for preparing such articles with reduced levels of plate-out, fuming, mould sweat and/or juicing.

The polycarbonate compositions, articles and processes according to the invention are based on the use of specific cyanacrylic acid ester types of UV absorbers having a molecular weight of at least 500 g/mol. These compounds and methods for their preparation are taught in U.S. Pat. No. 5,821,380 which is incorporated by reference. These compounds are generally represented by the following formula:

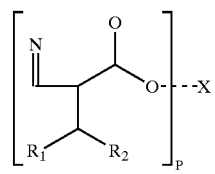

where the $R_1$ and $R_2$ substituents are each hydrogen or a radical having an iso- or heterocyclic ring system with at least one iso- or heteroaromatic nucleus, and at least one of the radicals $R_1$ or $R_2$ must be different from hydrogen; p has an average value of from about 2 to about 10, preferably at least 3 and more preferably has a value of 4; X is the radical of an aliphatic or cycloaliphatic polyol having from about 3 to about 20 carbon atoms and at least p hydroxyl groups, a cycloaliphatic radical optionally containing 1 or 2 hetero atoms, and an aliphatic radical optionally being interrupted by up to 8 non-adjacent oxygen atoms, sulfur atoms, imino or $C_1$–$C_4$-alkylimino groups.

These higher molecular weight cyanacrylic acid ester compounds are selected to provide optimized benefits and properties in the areas of UV stabilization performance, improved processability (due to reduced volatility, reduced plate-out, reduced fuming, and the like) and performance and appearance of the final articles. In general, these compounds should have molecular weights greater than about 500, preferably greater than about 700, more preferably greater than about 800 and most preferably greater than about 900 g/mol. In general, at higher molecular weights there is diminishing solubility in polycarbonate and increasing costs and molecular weights of these compounds should not be greater than about 2500, preferably not greater than about 2000, more preferably not greater than about 1800, and most preferably not greater than about 1600 g/mol.

A preferred example of the UV absorbers of this invention is: 1,3-Bis-[(2'-cyano-3',3'-diphenylacryloyl)oxy]-2,2-bis-[(2-cyano-3',3'-diphenylacryloyl)oxy]methyl)propane having the Tradename Uvinul 3030 and commercially available from BASF. It has the general molecular structure $C_{69}H_{48}N_4O_8$, a molecular weight of 1060 g/mol, a melting Point of 170–180° C. and a CAS number of 78671-58-4. It is represented by the following structure:

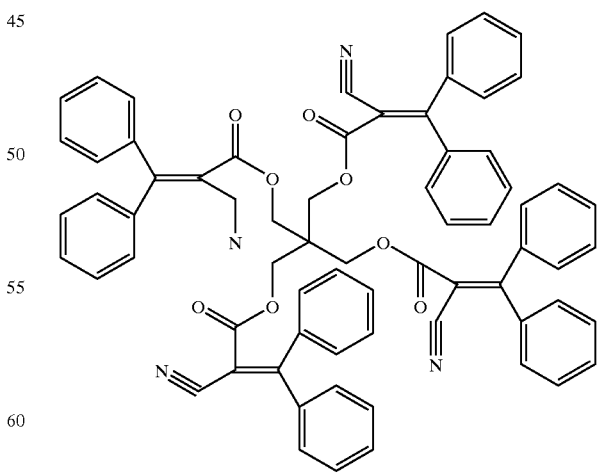

The amounts of the cyanacrylic acid ester types of UV-absorbers to be included in the polycarbonate resins according to the present invention will vary depending upon whether they are to be employed in "standard" levels throughout the total thickness or bulk of the polycarbonate to be stabilized or in a concentrate, capstock or surface coating type of resin where relatively high concentrations are employed in order to completely block UV transmittance to the substrate article or layers in a relatively thin layer thickness. In general, to provide UV absorption protection to the polycarbonate resins, these compounds can be used in "standard" levels of at least about 0.05 weight percent (wt %) based on weight of polycarbonate resin into which the compound is being incorporated, preferably at least about 0.10 wt %, more preferably at least about 0.15 wt % and most preferably at least about 0.20 wt %. If preparing a concentrate resin, capstock resin or other type of surface coating these compounds can be used in levels of at least about 1 wt %, preferably at least about 2 wt %, more preferably at least about 3 wt % and most preferably at least about 4 wt %. In general, at higher concentration levels there is diminishing UV protection benefit and levels of these compounds should not be greater than about 15 wt %, preferably not greater than about 12 wt %, more preferably not greater than about 10 wt % and most preferably not greater than about 8 wt %.

In addition, the compositions/articles/processes according to the present invention also employ an additional phenyl phosphite stabilizer where there are preferably at least two substitutions per phenyl group(s) bonded to the P(O)$_3$ (phosphite) and which can be a mono- or diphosphite. These compounds are generally known and are taught in JP 10-044,356, JP 10-044,357 and JP 10-044,358. These compounds are represented generally by the following structures:

For monophosphates, compounds represented generally by the following structures:

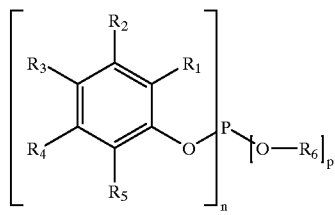

where the R substituents may be the same or different and can independently of one another be H, $C_1$–$C_{15}$ alkyl, $C_5$–$C_{10}$ cycloalkyl, $C_7$–$C_{20}$ aralkyl, $C_6$–$C_{14}$ aryl, —$OR_7$ or —$COOR_7$ where $R_7$ is H, $C_1$–$C_{15}$ alkyl, $C_5$–$C_{10}$ cycloalkyl, $C_7$–$C_{20}$ aralkyl, or $C_6$–$C_{14}$ aryl and provided that at least two of the 5 R groups per phenyl ring must be different than H; n is from 1 to 3, preferably 3; and p is 3–n. or

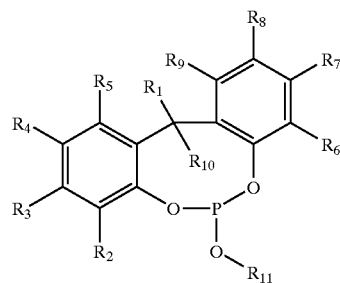

where the R substituents may be the same or different and can independently of one another be H, $C_1$–$C_{15}$ alkyl, $C_5$–$C_{10}$ cycloalkyl, $C_7$–$C_{20}$ aralkyl, $C_6$–$C_{14}$ aryl, —$OR_{12}$ or —$COOR_{12}$ where $R_{12}$ is H, $C_1$–$C_{15}$ alkyl, $C_5$–$C_{10}$ cycloalkyl, $C_7$–$C_{20}$ aralkyl, or $C_6$–$C_{14}$ aryl and provided that at least two of the 5 R groups per phenyl ring must be different than H.

For diphosphites compounds represented generally by the following structure:

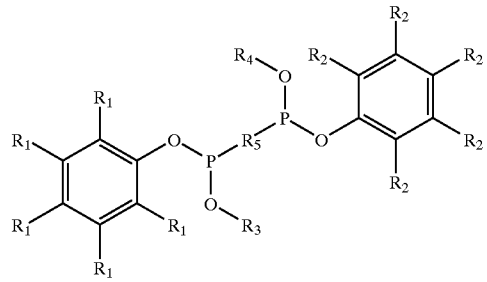

where the $R_1$, $R_2$, $R_3$ and $R_4$ substituents may be the same or different and can independently of one another be H, $C_1$–$C_{15}$ alkyl, $C_5$–$C_{10}$ cycloalkyl, $C_7$–$C_{20}$ aralkyl, $C_6$–$C_{14}$ aryl, —$OR_6$ or —$COOR_6$ where $R_6$ is H, $C_1$–$C_{15}$ alkyl, $C_5$–$C_{10}$ cycloalkyl, $C_7$–$C_{20}$ aralkyl, or $C_6$–$C_{14}$ aryl and provided that at least two of the 5 R groups per phenyl ring must be different than H; $R_5$ is divalent and may be $C_1$–$C_{15}$ alkyl, $C_5$–$C_{10}$ cycloalkyl, $C_7$–$C_{20}$ aralkyl, $C_6$–$C_{14}$ aryl or

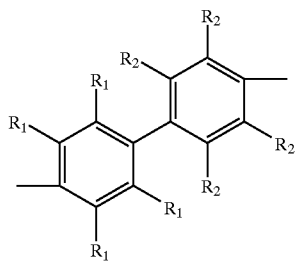

where the $R_1$ and $R_2$ substituents may be the same or different and can independently of one another be H, $C_1$–$C_{15}$ alkyl, $C_5$–$C_{10}$ cycloalkyl, $C_7$–$C_{20}$ aralkyl, $C_6$–$C_{14}$ aryl, —$OR_6$ or —$COOR_6$ where $R_6$ is H, $C_1$–$C_{15}$ alkyl, $C_5$–$C_{10}$ cycloalkyl, $C_7$–$C_{20}$ aralkyl, or $C_6$–$C_{14}$ aryl and the $R_3$ and $R_4$ substituents may also be:

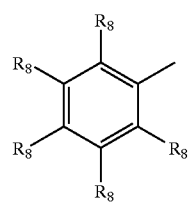

where the $R_8$ substituents may be the same or different and can independently of one another be H, $C_1$–$C_{15}$ alkyl, $C_5$–$C_{10}$ cycloalkyl, $C_7$–$C_{20}$ aralkyl, $C_6$–$C_{14}$ aryl, —$OR_6$ or —$COOR_6$ where $R_6$ is H, $C_1$–$C_{15}$ alkyl, $C_5$–$C_{10}$ cycloalkyl, $C_7$–$C_{20}$ aralkyl, or $C_6$–$C_{14}$ aryl and provided that at least two of the 5 R groups per phenyl ring must be different than H;

or diphosphite compounds represented generally by the following structure:

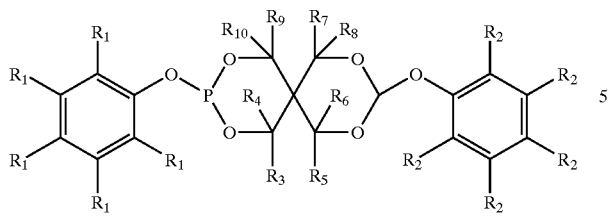

where the $R_1$ to $R_{10}$ substituents may be the same or different and can independently of one another be H, $C_1$–$C_{15}$ alkyl, $C_5$–$C_{10}$ cycloalkyl, $C_7$–$C_{20}$ aralkyl, $C_6$–$C_{14}$ aryl, —$OR_{11}$ or —$COOR_{11}$ where $R_{11}$ is H, $C_1$–$C_{15}$ alkyl, $C_5$–$C_{10}$ cycloalkyl, $C_7$–$C_{20}$ aralkyl, $C_6$–$C_{14}$ aryl, provided that at least two of the 5 R groups per phenyl ring must be different than H.

The selection of suitable and preferred phosphite compounds is based upon providing optimized combinations of their known secondary antioxidation properties (reaction with hydroperoxides preventing further degradation of the polycarbonate) along with surprising contributions to the UV stability, color reduction, color stability, plateout reduction and fuming reduction.

One of the preferred phosphite stabilizers is tris(2,4-di-tert-butylphenyl)phosphite commercially available under the Tradename Irgafos 168 from Ciba Geigy and is represented by the following structure:

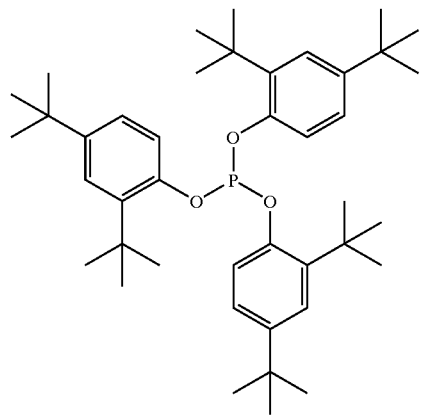

Other preferred phenyl phosphite stabilizers are bis(2,4-di-tert-butyl-phenyl) pentaerythritoldiphosphite:

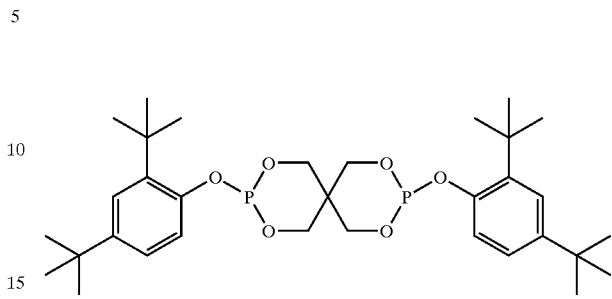

which is commercially from Great Lakes Chemical as Alkanox P-24;

and Bis(2,6-di-tert-butyl-4-methylphenyl)pentaerythritol diphosphite:

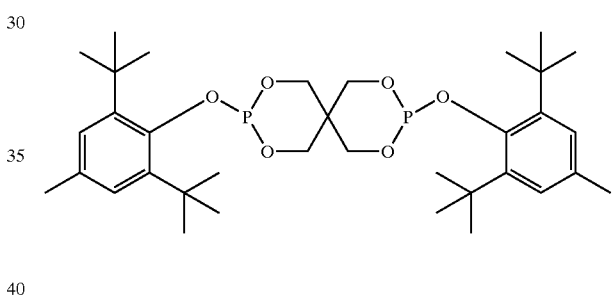

which is commercially available from ASAHI DENKA KOGYO K.K. as ADK STAB PEP-36;

and bis(2,4-dicumylphenyl)pentaerythritol diphosphite

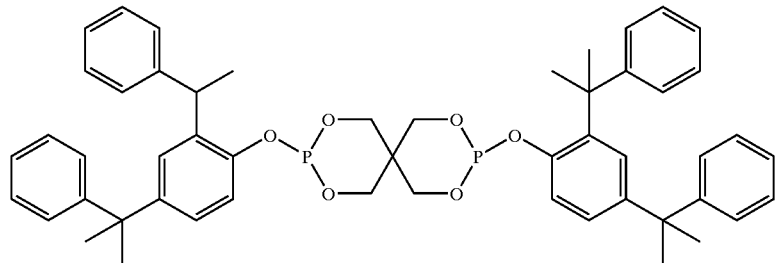

which is commercially available from Great Lakes Chemical as ALKANOX 28 and from Dover Chemical Corp. as DOVERPHOS S-9228;

and Tetrakis(2,4-di-tert-butyl-phenyl) 4,4'-biphenylene-diphosphonite:

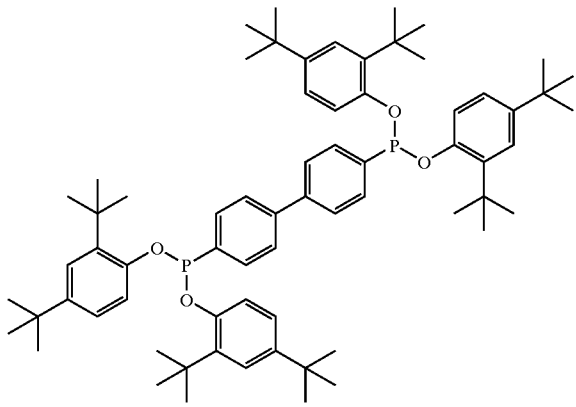

which is commercially available from Ciba Specialty Chemicals Inc. as Irgafos P-EPQ and from Great Lakes Chemical as Alkanox 24-44;

and 2,2'-methylenebis(4,6-di-tert-butyl-phenyl)octyl-phosphite:

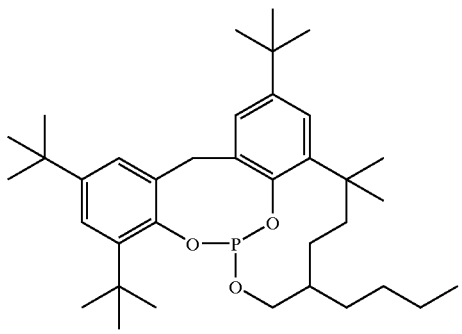

which is commercially available from Asahi Denka Kogyo K.K. as ADK STAB HP-10.

The amounts of the phosphite stabilizer to be included in the polycarbonate resins according to the present invention will vary depending upon the desired balance of the above mentioned combinations of properties and cost. In general, to provide noticeable stabilizing effects and benefits, the phosphite stabilizers should be used at levels of at least about 20 parts per million (ppm) based on weight of polycarbonate resin into which the compound is being incorporated, preferably at least about 30 ppm and most preferably at least about 50 ppm. In general, at higher concentration levels there is diminishing benefit and levels of these compounds should not be greater than about 1500 ppm, preferably not greater than about 1000 ppm, and most preferably not greater than about 750 ppm.

In addition to the phosphite stabilizer, it is also desirable to include hindered phenol and/or lactone type stabilizers, most preferably both types.

The compositions according to the invention, therefore, also desirably employ a hindered phenol-type stabilizer. These stabilizers and methods for their preparation are generally known and commercially available. These compounds generally contain at least one moiety represented by the following structure:

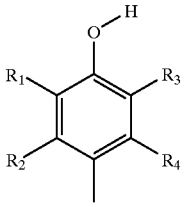

wherein R1 through R4 are selected from and can independently of one another be H, $C_1$–$C_{15}$ alkyl, $C_5$–$C_{10}$ cycloalkyl, $C_7$–$C_{20}$ aralkyl, $C_6$–$C_{14}$ aryl, and provided that at least R1 and R3 must be different than H. One or more of these moieties are bonded through the unspecified, open valence to any of a wide variety of alkyl, cycloalkyl, aralkyl, or aryl radicals having up to 30 carbon atoms and optionally being interrupted by up to 8 non-adjacent sulfur atoms, imino or $C_1$–$C_4$-alkylimino groups, oxygen atoms, and/or carboxylic groups. It should be noted that the hindered phenol compounds can be mono-, di-, tri- and tetra-phenols and including combinations of two or more of these.

The selection of suitable and preferred hindered phenol-type stabilizers is based upon providing the known benefit of primary antioxidation (reaction with peroxides to reduce the autocatalytic degradation of PC) as well as the surprising contributions to the UV stability, reduced color, color stability, reduced plateout and reduced fuming that are provided in the in the final formulations.

A preferred hindered phenol is octadecyl 3,5-di-t-butyl-4-hydroxyhydrocinnamate which is commercially available under the tradename Irganox 1076 from Ciba Specialty Chemicals Inc. and is generally represented by the following structure:

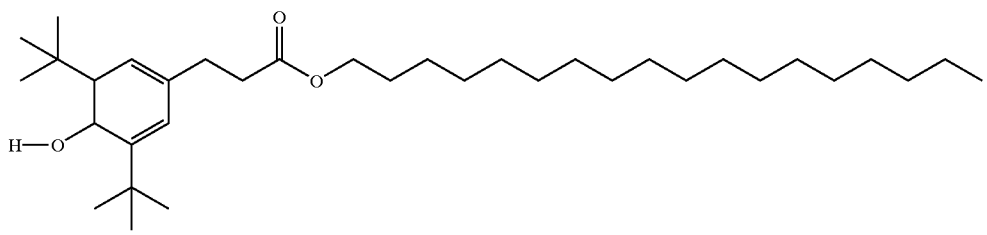

Other preferred hindered phenols include those available under the following trade names and represented by the indicated chemical formulae:

Monophenols such as Irganox 1135:

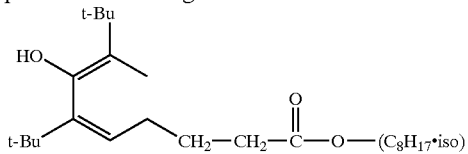

Di-phenols such as Irganox 245

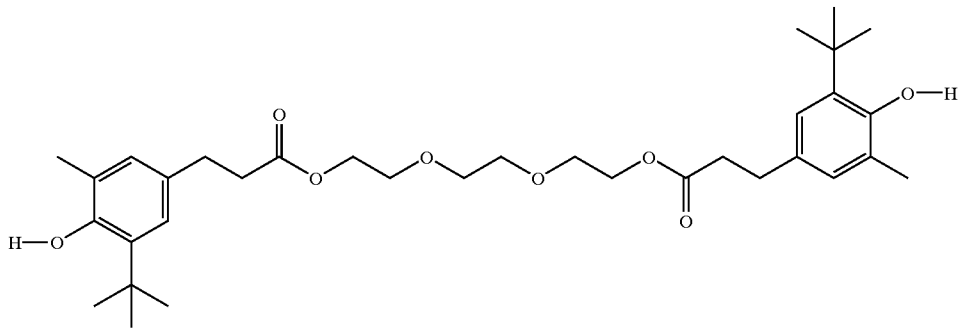

and Irganox 259;

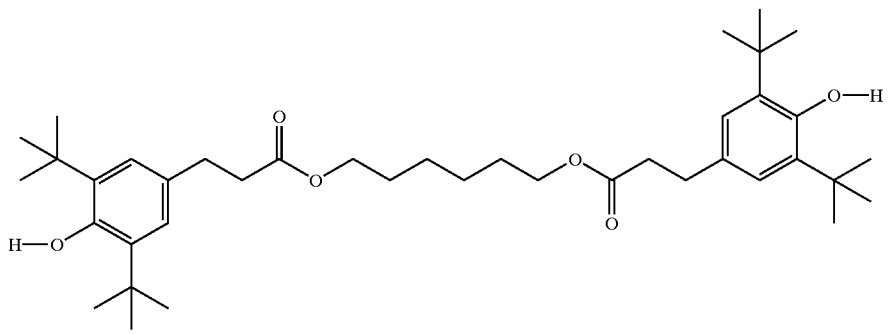

Tri-phenols such as Irganox 1330

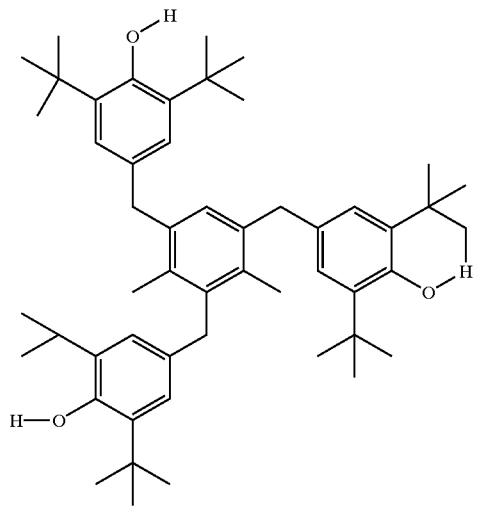

Tetra-phenols such as Irganox 1010

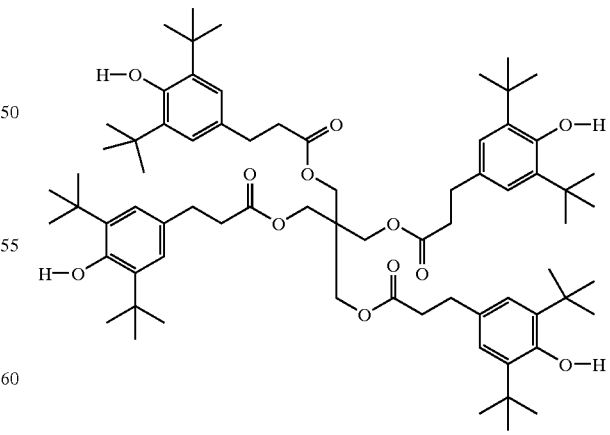

In general, to provide noticeable stabilization benefits, the hindered phenol-type stabilizer should be used at levels of at least about 10 parts per million (ppm) based on weight of polycarbonate resin into which the compound is being incorporated, preferably at least about 15 ppm and most preferably at least about 25 ppm. In general, at higher concentration levels there is diminishing benefit and levels of these compounds should not be greater than about 2000 ppm, preferably not greater than about 1500 ppm, and most preferably not greater than about 1000 ppm.

The compositions according to the invention also desirably employ a benzofuran-2-one type (lactone-type) stabilizer. These stabilizers and methods for their preparation are generally known and are taught in GB Patent 2,322,861 and U.S. Pat. Nos. 4,325,863; 5,175,312; 5,252,643; 5,216,052; 5,369,159; 5,488,177; 5,356,966; 5,367,008; 5,428,162; 5,428,177; 5,516,920 which are incorporated by reference.

Preferably, a benzofuran-2-one (lactone) type stabilizer according to the following description is used:

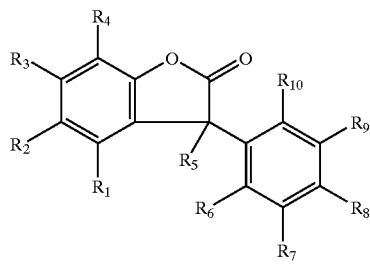

wherein $R_1$, $R_3$ and $R_5$ are hydrogen, $R_2$ and $R_4$ are independently of each other hydrogen or $C_1$–$C_6$ alkyl, $R_6$ through $R_{10}$ are independently of each other hydrogen, $C_1$–$C_4$ alkyl, $C_1$–$C_4$ alkoxy or —OCH$_2$CH$_2$—O—$R_{11}$, $R_{11}$ is $C_2$–$C_4$ alkanoyl and provided that at least two of $R_6$ through $R_{10}$ are hydrogen.

The selection of suitable and preferred lactone-type stabilizers is based upon providing their known benefit of free radical scavenging (free radical formation being the first step leading to the autocatalytic degradation of PC) in combination with obtaining their unexpected contributions to the UV stability, reduced color, color stability, reduced plateout and reduced fuming that are provided in the in the final formulations.

A preferred benzofuran-2-one type or lactone-type stabilizer is 2(3H)-Benzofuranone, 5,7-bis(1,1-dimethylethyl)-3-3(3,4-dimethylphenyl), available under the tradename HP-136 from Ciba Specialty Chemicals Inc. and is generally represented by the following structure:

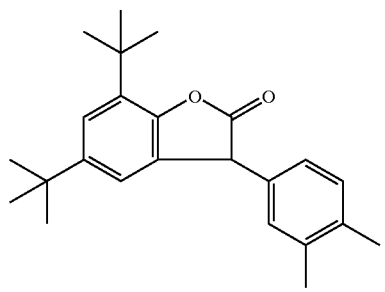

In general, to provide noticeable effects/benefits, the lactone-type stabilizer should be used at levels of at least about 5 parts per million (ppm) based on weight of polycarbonate resin into which the compound is being incorporated, preferably at least about 10 ppm and most preferably at least about 15 ppm. In general, at higher concentration levels there is diminishing benefit and levels of these compounds should not be greater than about 750 ppm, preferably not greater than about 500 ppm, and most preferably not greater than about 4000 ppm.

Preformulated mixtures of these three types of stabilizers (phosphite, hindered phenol and lactone) are commercially available from Ciba Specialty Chemicals Inc. as indicated below with the indicated ratios (by weight) of the three components:

| | | | | |
|---|---|---|---|---|
| Irganox HP 2215 | ratio 2/4/1 | Irganox 1010 | Irgafos 168 | HP-136 |
| Irganox HP 2225 | ratio 3/3/1 | Irganox 1010 | Irgafos 168 | HP-136 |
| Irganox HP 2251 | ratio 3/2/1 | Irganox 1010 | Irgafos 168 | HP-136 |
| Irganox HP 2921 | ratio 2/3/1 | Irganox 1076 | Irgafos 168 | HP-136 |
| Irganox XP 420 | ratio 3/2/1 | Irganox 1010 | Irgafos P-EPQ | HP-136 |
| Irganox XP 490 | ratio 3/2/1 | Irganox 1076 | Irgafos P-EPQ | HP-136 |

All types of polycarbonate are generally suitable for use in the resins, articles and processes of the present invention. Many types of suitable polycarbonates are well known and commercially available. Suitable types of polycarbonates include linear and branched polycarbonates as well as blends thereof. As mentioned above, the present invention is directed both to formulations based on polycarbonate resins which can be directly used to prepare molded, shaped or otherwise fabricated articles ("bulk stabilized resins") and to formulations based on polycarbonate resins which can be used as a surface or external coating or layer ("capstock resins") to protect substrate articles or core layers which can be a polycarbonate resin of the same or different type or some other polymer resin.

TABLE I

Examples of Some Preferred Polycarbonate Resins:

| | MFR | Mw | Mn | MWD | Type |
|---|---|---|---|---|---|
| Calibre 600-3 | 3 | 36500 | 13700 | 2.66 | Branched |
| Calibre 200-3 | 3 | 38700 | 14200 | 2.72 | Linear |
| Calibre 200-15 | 15 | 26400 | 10500 | 2.52 | Linear |

The materials shown in Table I are, as shown, Calibre brand, commercially available polycarbonate resins from The Dow Chemical Company. The molecular weights of the components were determined by gel permeation chromatography (GPC). The melt flow rate (MFR) values are measured according to ASTM D-1238, conditions of 300° C. and 1.2 kilograms mass and are reported in grams per 10 minutes (gr/10 min). Unless otherwise indicated, the references to "molecular weight" herein refer to weight average molecular weights ("Mw") determined on the carbonate polymers using gel permeation chromatography with a bisphenol A polycarbonate standard. Otherwise, viscometry or light scattering can also be used to determine weight average molecular weight.

The polycarbonate resins of the present invention can be prepared using any of the known polycarbonate polymerization processes, including the interfacial process, solution process or the melt or solid state advancement versions of the transesterification carbonate polymer polymerization process.

In general, these carbonate polymers are prepared from one or more multihydric components by reacting the multihydric compound, such as a diphenol, with a carbonate precursor such as phosgene, a haloformate or a carbonate ester such as diphenyl or dimethyl carbonate. Aromatic carbonate polymers are preferred and aromatic diphenols are preferred for use as at least part of the multihydric compound with preferred diphenols including but not limited to 2,2-bis(4-hydroxyphenyl)-propane (bisphenol A), phenol, 4,4'-(9-H-fluorene-9-ylidene)bis (bishydroxyphenylfluorene), 4,4'-thiodiphenol (TDP), 1,1-bis(4--hydroxyphenyl)-1-phenyl ethane (bisphenol AP); phenolphthalein; bis(4-hydroxyphenyl) diphenyl methane; tetrabromobisphenol A (TBBA); and tetrachlorobisphenol A (TCBA). These carbonate polymers also include aromatic carbonate polymers prepared from two or more different dihydric phenols or a combination of a dihydric phenol and a glycol or a hydroxy- or acid-terminated polyester or a dicarboxylic acid in the event a carbonate copolymer or heteropolymer is desired.

Suitable types and amounts of chain terminators (typically monophenolic compounds) and, in the case of branched polycarbonates, branching agents (typically phenols having three or more hydroxy groups) can be employed to obtain the desired molecular weight and branching degrees in the higher molecular weight branched component. Suitable branching agents are generally one or more of the following: phloroglucin; phloroglucid; 2,6-dimethyl-2,4,6-tri(4-hydroxyphenyl)heptene-3; 4,6-dimethyl-2,4,6-tri(4-hydroxyphenyl)heptene-2; 4,6-dimethyl-2,4,6-tri(4-hydroxyphenyl)pentene-2; 4,6-dimethyl-2,4,6-tri(4-hydroxyphenyl)pentane; 1,3,5-tri(4-hydroxyphenyl) benzene; 1,3,5-tri(2-hydroxyphenyl)benzol; 1,1,1-tri(4-hydroxyphenyl)ethane; 2,6-bis(2-hydroxy-5-methylbenzyl)-4-methylphenol; tetra(4-hydroxy-phenyl)methane; trisphenol; bis(2,4-dihydroxyphenyl)ketone; 1,4-bis(4,4-dihydroxytriphenylmethyl)benzene; $\alpha,\alpha',\alpha''$-tri(4-hydroxyphenyl)-1,3,5-tri-isopropylbenzene; 3,3-bis(4-hydroxyaryl)oxyindole;, isatinbisphenol; 5-chloroisatin; 5,7-dichloroisatin; 5-bromoisatin; trimellitic acid; pyromellitic acid; benzophenonetetracarboxylic acid; and including for the appropriate compounds, the acid chlorides or other condensation reactive derivatives thereof. Specifically preferred branching agents include phloroglucin; phloroglucid; 1,1,1-tri(4-hydroxyphenyl)ethane; trimellitic acid; pyromellitic acid; benzophenonetetracarboxylic acid and acid chlorides thereof; 2,6-bis(2-hydroxy-5-methylbenzyl)-4-methylphenol and 1,3,5-tri(4-hydroxyphenyl)benzene.

It has been found that levels of branching agent in the branched carbonate polymer components for use in the present invention should be in the range of from 0.005 to 0.1 mole branching agent per mole of dihydroxy compound, preferably from 0.01 to 0.8, and more preferably from 0.1 to 0.6.

In general, by whatever production technique it is prepared and whichever type or types it is, the carbonate polymer should have a molecular weight that provides the desired balance of processing features (melt flow rate, melt strength, shear sensitivity) and physical properties (toughness, surface properties and the like) according to the known trade-offs between these. In general, the polycarbonate resin should have a weight average molecular weight of at least about 18,000, preferably at least about 20,000 and more preferably at least about 21,000 and not greater than about 42,000, preferably not greater than about 41,000 and more preferably not greater than about 40,000.

In general, branched carbonate polymers are commercially available and should have a weight average molecular weight of at least about 22,000, preferably at least about 25,000 and more preferably at least about 27,000. In order to obtain branched polymer with minimized levels of gels and other beneficial effects of the branched component, it has been found that the weight average molecular weight of a branched polymer should not be higher than 39,000, preferably not higher than 38,000, most preferably not higher than 37,000. In this range it has been found that the branched carbonate polymer should have a melt flow rate of at least 2 grams per 10 minutes (g/10'), preferably at least about 2.5 g/10', most preferably at least 3.0 g/10' and preferably no more than 30 g/10', preferably no more than 15 g/10', more preferably no more than 12 g/10'. In general, it can be indirectly determined whether there is a sufficient degree of branching in the branched carbonate polymer by measuring the change in shear sensitivity due to the incorporation of the branched carbonate polymer in a carbonate polymer blend composition. These measurements of shear sensitivity can be done by standard techniques with dynamic mechanical spectroscopy (DMS) or by capillary rheometry.

Suitable linear carbonate polymers are known in the literature and commercially available. For purposes of obtaining desired toughness and crack resistance, it has been found that the linear carbonate polymer component should have a weight average molecular weight of at least 18,000, preferably at least 20,000, and most preferably at least 21,000. In order to keep the desired level of polymer melt flow and processability it has been found that the linear carbonate polymer component should have a weight average molecular weight of no more than 42,000, preferably no more than 41,000, most preferably no more than 40,000. In this range it has been found that the linear carbonate polymer should have a melt flow rate of at least 2 g/10', preferably at least 2.5 g/10' and most preferably at least 3.0 g/10' and preferably no more than 80 g/10', preferably no more than 40 g/10', most preferably no more than 35 g/10'.

For the present invention, blend compositions consisting of a branched polycarbonate and a linear carbonate polymer component can be used. It is understood that the polycarbonate resins suitable for use according to the present invention may be a single component carbonate polymer directly obtained from a polymerization process. On the other hand, the carbonate polymer can also be based on a combination of two components of the same type of differing molecular weights and melt flow rates that are blended to obtain the desired intermediate melt flow rate product.

The branched and linear carbonate polymers suitable for use in the present invention also include carbonate polymers prepared from two or more different multihydroxy compounds, preferably dihydroxy compounds, and preferably phenols, or a combination of a multihydroxy compound, such as a diphenol, and a glycol or a hydroxy- or acid-terminated polyester or a dicarboxylic acid in the event a carbonate copolymer or heteropolymer is desired. It is also possible to employ multifunctional carboxylic acids, especially aromatic carboxylic acids, and prepare poly(estercarbonate) resins such as the known aromatic poly (estercarbonates). The known silicon-containing carbonate monomers can also be used to prepare silicon-containing carbonate polymers that are suitable for use in the present invention.

The present invention also involves the use of the polycarbonate compositions as described above to provide the following wide range of improved processes to prepare molded, shaped or otherwise fabricated articles and improved articles having improved combinations of protection against UV radiation, color and color stability with reduced plate-out behavior during processing. Injection molding, injection blow molding, injection compression molding, extrusion, blow molding, film blow molding, thermoforming and foaming processes for polycarbonate resins are well known in the art and commercially practiced for production of a broad range of parts and structures. As is known, extrusion processes for preparing sheet, profiles and like structures involve the steps of melting, forcing the melted polymer through a die, calibration, if needed, and cooling. As is known, blow molding processes for preparing bottles, containers, instrument panels and like structures involve the steps of extrusion of an expandable parison, expansion or blowing of the parison to the desired shape and cooling. As is known, thermoforming processes for preparing trays, containers, chocolate moulds, and like structures involve the steps of preparing a thermoformable sheet or preform, heating the sheet or preform adjacent to the mould or form of the desired shape, applying a pressure (air pressure or a physical force) or suction to appropriately shape the sheet or preform in the mould or form and cooling.

As is known, foaming processes for preparing electronic parts, business equipment and like structures involve the steps of applying sufficient heat or other energy to activate a blowing agent that is incorporated in the heat softened carbonate polymer, followed by expansion of the foam cells and optional shaping.

The improvements in resins, processes and articles and structures according to the present invention are due to the improved UV resistance, improved color and color stability and reduced tendency to plate-out and fuming that provide improved productivity versus a standard resin. In addition to the UV absorbers and the thermal stabilizers according to the present invention, the polycarbonate composition can advantageously contain the standard types and amounts of the additive-type components frequently incorporated into carbonate polymers. These components can include ignition resistance additives, fillers (that is, glass fibers, talc, clay, etc.), pigments, dyes, mold release agents, impact modifiers, antistatic additives, and the other additives commonly employed in carbonate polymer compositions. The resins according to the invention are also advantageously used in blend compositions with other polymer resins such as monovinylidene aromatic polymer optionally containing an impact modifier component (e.g., ABS or AES).

EXPERIMENTS

Several experiments were performed showing the benefits of resins according to the present invention in terms of UV stability, prevention of thermal loss of UV absorbers and improved base color and color stability. These Experiments are given to further illustrate the invention and should not be construed as limiting its scope.

Polycarbonate ("PC")

The polycarbonate resin used all of these experiments as Calibre 200-15 brand polycarbonate resin commercially available from The Dow Chemical Company. This resin is a linear polycarbonate produced from bisphenol A as the bisphenol and phosgene as the carbonate precursor, has a molecular weight (weight average) of about 26400 (as measured by GPC) and a melt flow of 15 grams per 10 minutes rate (as measured by according to ASTM D-1238 (300° C./1.2 kg).

Additives

UV absorbers used in the experiments are:

Cyanacrylic acid ester—Tradename Uvinul 3030 from BASF (also referred to as "Uvinul" or "Uvinul 3030")
Molecular weight: 1060 g/mol
Chemical name: 1,3-Bis-[(2'-cyano-3',3'-diphenylacryloyl)oxy]-2,2-bis-[(2-cyano-3',3'-diphenylacryloyl)oxy]methyl)propane Dimeric Benzotriazole—Tradename LA-31 from Adeka Argus (also referred to as "LA-31")
Molecular weight: 662 g/mol
Chemical name: 2,2'-methylen-bis-(6-{2H-benzotriazol-2-yl}-4-{1,1,3,3-tetramethylbutyl}-phenol)
Triazine—Tradename Tinuvin 1577 from Ciba Geigy (also referred to as "Tinuvin" or "Tinuvin 1577")
Molecular weight: 429 g/mol
Chemical name: 2-(4,6-diphenyl-1,3,5-triazin-2-yl)-5-hexyloxyphenol The "co-stabilizers" used in the following experiments are:

Phosphite type—Tradename Irgafos 168 from Ciba Specialty Chemicals Inc. (also referred to as "P 168")
Molecular weight: 646 g/mol
Chemical name: Tris(2,4-di-tert-butylphenyl)phosphite
Hindered Phenol type—Tradename Irganox 1076 from Ciba Specialty Chemicals Inc. (also referred to as "I 1076")
Molecular weight: 530 g/mol
Chemical name: Octadecyl 3,5-di-t-butyl-4-hydroxyhydrocinnamate
Lactone Type—Tradename HP-136 from Ciba Specialty Chemicals Inc. (also referred to as "HP 136")
Molecular weight: 354 g/mol
Chemical name: 2(3H)-Benzofuranone, 5,7-bis(1,1-dimethylethyl)-3-3(3,4-dimethylphenyl)-

Determination of Initial Base Color and Color Stability

For the purpose of such assessment, the additives (UV absorbers and stabilizers) were compounded in the polycarbonate feedstocks at levels between 3000 and 50,000 ppm (0.3 and 5 wt %) on a ZSK-25 twin screw co-rotating Werner and Pfleiderer extruder. The temperature profile used in the extruder was 240° C.–250° C.–260° C.–270° C.–280° C.–290° C.–300° C.–300° C.

Prior to compounding, the polycarbonate was dried at 120° C. for 4 hours. The initial base color was measured on the produced granules using a Hunterlab Colorquest Colorimeter. Granules are placed in a 50 mm by 50 mm by 50 mm quartz cuvette and color is measured in Reflection mode. Color is expressed using the Yellowness Index YI D1925 as well as the CIE Lab L*, a* and b*-values. Each measurement is repeated at least five times and an average is calculated.

The polycarbonate granules are subsequently injection molded into color chips on an ARBURG 800-325 Allrounder 370 CMD injection molding machine. The color is measured on the 3.0 mm plaques using the Hunterlab Colorquest Colorimeter. For the transparent polycarbonate, the measurement is done using the Transmission mode. As color data, the Yellowness Index YI D1925 as well as the CIE Lab L*, a* and b*-values are recorded. Each measurement is repeated at least five times and an average is calculated.

Injection molding conditions were varied in order to assess the sensitivity of the various resins on initial color and color stability. Particularly, injection molding temperatures at the die of 320° C. and 380° C. were used, when UV absorber levels were below 1 wt %. At higher UV absorber levels, injection molding temperatures at the dye of 280° C. were used. All other molding parameters were kept constant.

An increasing temperature profile from hopper to die was used. Per zone, an increment of 10° C. was set. For instance, for a die set temperature of 380° C., a temperature profile 340–350–360–370–380° C. was used. For the sake of simplicity, only the die set temperature is mentioned in the experiments.

The barrel residence time was kept constant by adjusting the machine cycle time at 40 seconds. Taking into account the barrel volumes and part weight, this corresponds to a total barrel residence time of 5 minutes. A five step holding pressure profile was used in each case. Per step, holding pressure was decreased by 100 bar. A typical holding pressure profile was 1200–1100–1000–900–800 bar. During molding, part weight was monitored continuously. When a deviation occurred, this was corrected by adjusting holding pressures. Corrective actions were made in steps of 100 bar over the entire holding pressure profile.

The difference between the color measured at 380° C. and at 320° C. is regarded as a measure for the thermal stability of the polycarbonate materials.

TABLE 1

| Exp. No. | UV Absorber | P 168 | I 1076 | HP 136 |
|---|---|---|---|---|
| 1* | — | — | — | — |
| 2* | — | 400 ppm | — | — |
| 3* | — | 115 ppm | 55 ppm | 30 ppm |
| 4* | Tinuvin 3000 ppm | — | — | — |
| 5* | Tinuvin 3000 ppm | 400 ppm | — | — |
| 6* | LA31 3000 ppm | — | — | — |
| 7* | LA31 3000 ppm | 400 ppm | — | — |
| 8* | Uvinul 3000 ppm | — | — | — |
| 9 | Uvinul 3000 ppm | 400 ppm | — | — |
| 10 | Uvinul 3000 ppm | 115 ppm | 55 ppm | 30 ppm |

TABLE 2

| Exp. No. | Additives | B* granules | YI granules | YI 320° C. | YI 380° C. | ΔYI | YI 320° C. QUV-B (700 hours) | ΔYI |
|---|---|---|---|---|---|---|---|---|
| 1* | None | 2.78 | | 3.55 | 3.86 | 0.31 | | |
| 2* | P 168 | 1.20 | | 3.16 | 3.55 | 0.39 | | |
| 3* | P 168 + I 1076 + HP 136 | 1.75 | | 3.03 | 3.16 | 0.13 | | |
| 4* | Tinuvin | 6.45 | 11.20 | 4.42 | 4.49 | 0.07 | 12.79 | 8.37 |
| 5* | Tinuvin + P 168 | 6.25 | 10.69 | 4.10 | 4.28 | 0.18 | 12.99 | 8.89 |
| 6* | LA31 | 3.74 | 6.11 | 3.70 | 4.01 | 0.31 | 13.84 | 10.14 |
| 7* | LA31 + P 168 | 3.94 | 6.55 | 3.52 | 3.65 | 0.13 | 13.68 | 10.16 |
| 8* | Uvinul | 3.62 | 6.28 | 2.89 | 3.89 | 1.00 | 14.05 | 11.16 |
| 9 | Uvinul + P 168 | 3.82 | 6.72 | 2.72 | 3.45 | 0.73 | 13.25 | 10.53 |
| 10 | Uvinul + P 168 + I 1076 + HP 136 | 2.40 | 3.66 | 2.43 | 3.00 | 0.57 | 12.01 | 9.58 |

UV-stability testing

Injection molded plaques, as molded from the thermal stability study (condition 320° C.), were evaluated in a QUV-B test using 313 nm lamps where the samples were exposed to 4 hours of UV irradiation at 60° C. followed by 4 hrs of exposure to water condensation at 50° C. (in a heated saturated mixture of air and water vapor—ASTM G 53-88).

Determination of Loss of UV Additive

Diffusion-out experiments from a polymer plaque are performed as follows. For the purpose of such assessment, granules of the polycarbonate compositions containing the UV additives and the thermal stabilizers, prepared as discussed above, were taken and compression molded on an Akila compression molding press at a temperature of 260° C. into square plaques of 50 mm by 50 mm and having a thickness of 0.5 mm.

On these plaques, initial UV absorber contents was determined using a HPLC analysis technique. These plaques were placed in an air circulated oven at various temperatures for various residence times. After the oven exposure, the contents of the UV absorber was measured again and compared to the initial content.

The decrease in UV absorber contents can be regarded as a measure for the degree of fuming and plate-out that can be experienced during material processing such as injection molding or (co-)extrusion of sheet structures.

Polycarbonate was compounded with the levels of the various additives indicated in Table 1, below using the compounding conditions described above. The material was evaluated on base color, color stability and UV stability, according to the techniques described above. The performance is shown in Table 2, below.

Experiment 11

Polycarbonate 200-15 was compounded with 4.33 wt % Uvinul 3030 and 1000 ppm of P 168, using the compounding conditions described above. The material was evaluated on base color according to the techniques described above. Also desorption measurements were carried out at various temperatures for various residence times. The following color stability performance was found and the desorption performance is shown in Table 3, below:

TABLE 3

| Experiment 11 | YI Granules 25.44 | YI (280° C.) 10.88 | | | |
|---|---|---|---|---|---|
| Desorption | TIME (min) | | | | |
| TEMPERATURE (° C.) | 0 | 20 | 40 | 60 | 80 |
| 240 | 4.33 | 4.23 | 4.19 | 4.15 | 4.12 |
| 260 | 4.33 | 4.19 | 4.12 | 4.08 | 4.02 |
| 280 | 4.33 | 4.13 | 4.11 | 3.97 | 3.74 |
| DELTA = LOSS | | | | | |
| 240 | 0 | 0.10 | 0.14 | 0.18 | 0.21 |
| 260 | 0 | 0.14 | 0.19 | 0.25 | 0.31 |
| 280 | 0 | 0.20 | 0.22 | 0.36 | 0.59 |

Experiment 12

Polycarbonate 200-15 was compounded with 4.64 wt % Uvinul 3030, 670 ppm of P 168 and 330 ppm of I 1076, using The compounding conditions described above. The material was evaluated on base color according to the techniques described above. Also desorption measurements were carried out at various temperatures for various residence times. The following color stability performance was found and the desorption performance is shown in Table 4, below:

TABLE 4

| Experiment 12 | YI Granules 24.38 | YI (280° C.) 11.06 | | |
|---|---|---|---|---|
| Desorption | TIME (min) | | | |
| TEMPERATURE (° C.) | 0 | 20 | 40 | 60 | 80 |
| 240 | 4.64 | 4.61 | 4.58 | 4.41 | 4.40 |
| 260 | 4.64 | 4.47 | 4.38 | 4.34 | 4.23 |
| 280 | 4.64 | 4.45 | 4.34 | 4.22 | 4.09 |
| DELTA = LOSS | | | | | |
| 240 | 0 | 0.03 | 0.06 | 0.23 | 0.24 |
| 260 | 0 | 0.17 | 0.26 | 0.30 | 0.41 |
| 280 | 0 | 0.19 | 0.30 | 0.42 | 0.55 |

Experiment 13

Polycarbonate 200-15 was compounded with 4.31 wt % Uvinul 3030, 570 ppm of P 168, 280 ppm of I 1076 and 150 ppm of HP 136, using the compounding conditions described above. The material was evaluated on base color according to the techniques described above. Also desorption measurements were carried out at various temperatures for various residence times. The following color stability performance was found and the desorption performance is shown in Table 5, below:

TABLE 5

| Experiment 13 | YI Granules 18.75 | YI (280° C.) 9.25 | | |
|---|---|---|---|---|
| Desorption | TIME (min) | | | |
| TEMPERATURE (° C.) | 0 | 20 | 40 | 60 | 80 |
| 240 | 4.31 | 4.29 | 4.26 | 4.24 | 4.15 |
| 260 | 4.31 | 4.23 | 4.15 | 4.11 | 4.03 |
| 280 | 4.31 | 4.16 | 4.14 | 4.10 | 3.89 |
| DELTA = LOSS | | | | | |
| 240 | 0 | 0.02 | 0.05 | 0.07 | 0.16 |
| 260 | 0 | 0.08 | 0.16 | 0.20 | 0.28 |
| 280 | 0 | 0.15 | 0.17 | 0.21 | 0.42 |

Experiment 14

Polycarbonate 200-15 was compounded with 4.73 wt % Tinuvin 1577 and 1000 ppm of P 168, using the compounding conditions described above. The material was evaluated on base color according to the techniques described above. Also desorption measurements were carried out at various Temperatures for various residence times. The following color stability performance was found and the desorption performance is shown in Table 6, below:

TABLE 6

| Experiment 14 | YI Granules 39.61 | YI (280° C.) 21.17 | | |
|---|---|---|---|---|
| Desorption | TIME (min) | | | |
| TEMPERATURE (° C.) | 0 | 20 | 40 | 60 | 80 |
| 240 | 4.73 | 4.72 | 4.56 | 4.44 | 4.29 |
| 260 | 4.73 | 4.59 | 3.92 | 3.86 | 3.54 |
| 280 | 4.73 | 4.05 | 3.60 | 3.45 | 3.31 |
| DELTA = LOSS | | | | | |
| 240 | 0 | 0.01 | 0.17 | 0.29 | 0.44 |
| 260 | 0 | 0.14 | 0.81 | 0.87 | 1.19 |
| 280 | 0 | 0.68 | 1.13 | 1.28 | 1.42 |

Experiment 15

Polycarbonate 200-15 was compounded with 4.66 wt % LA-31 and 1000 ppm of P 168, using the compounding conditions described above. The material was evaluated on base color according to the techniques described above. Also desorption measurements were carried out at various temperatures for various residence times. The following color stability performance was found and the desorption performance is shown in Table 7, below:

TABLE 7

| Experiment 15 | YI Granules 29.02 | YI (280° C.) 14.97 | | |
|---|---|---|---|---|
| Desorption | TIME (min) | | | |
| TEMPERATURE (° C.) | 0 | 20 | 40 | 60 | 80 |
| 240 | 4.66 | 4.53 | 4.51 | 4.46 | 4.28 |
| 260 | 4.66 | 4.53 | 4.06 | 3.97 | 3.92 |
| 280 | 4.66 | 4.12 | 3.85 | 3.73 | 3.09 |
| DELTA = LOSS | | | | | |
| 240 | 0 | 0.13 | 0.15 | 0.20 | 0.38 |
| 260 | 0 | 0.13 | 0.58 | 0.69 | 0.74 |
| 280 | 0 | 0.54 | 0.81 | 0.93 | 1.57 |

From these experiments the following comparisons can be made:

| Expt. | Additives | | | | % Loss of UV absorber in 80 minutes | | |
|---|---|---|---|---|---|---|---|
| No. | UV | Other | Pellet YI | Molded YI | 240° C. | 260° C. | 280° C. |
| 11 | Uvinul | P 168 | 25.44 | 10.88 | 4.9 | 7.2 | 13.6 |
| 12 | Uvinul | P 168 + I 1076 | 24.38 | 11.06 | 5.2 | 8.8 | 11.9 |

-continued

| Expt. | | Additives | | | % Loss of UV absorber in 80 minutes | | |
|---|---|---|---|---|---|---|---|
| No. | UV | Other | Pellet YI | Molded YI | 240° C. | 260° C. | 280° C. |
| 13 | Uvinul | P 168 + I 1076 + HP 136 | 18.75 | 9.25 | 3.7 | 6.5 | 9.7 |
| 14* | Tinuvin | P 168 | 39.61 | 21.17 | 9.3 | 25.2 | 30.0 |
| 15* | LA-31 | P 168 | 29.02 | 14.97 | 8.2 | 15.9 | 33.7 |

*Not an example of the present invention

From these data, it can be concluded that the polycarbonate compositions comprising Uvinul 3030 and the phosphite stabilizer, and preferably the two and three thermal stabilizer package, yield the best balance of color and retention of UV absorber. Uvinul 3030 also gives the lowest color compared to the prior art dimeric benzotriazole and triazine type UV absorber formulations. Uvinul 3030 gives the best performance in terms of physical loss of UV absorber and, surprisingly, when the three thermal stabilizers are used, a reduced volatility of the UV absorber is noticed.

It can be seen that polycarbonate compositions, articles and fabrication techniques according to the invention provide improved combinations of resistance against UV-radiation, color and color stability, and retention of UV-absorber in the resin during processing ensuring negligible levels of fuming, plate-out, mould sweat, juicing, etc. It has been found that the present invention provided improved processes for preparing, among other things, extruded sheet structures, blow molded, thermoformed, injection molded, injection blow molded, injection compression molded, film blow molded or foamed parts or structures. It can be seen that the resulting parts or structures according to the present invention are surprisingly improved by use of the described polycarbonate resin compositions and the molded, shaped or otherwise fabricated articles will have improved combinations of physical and appearance properties including particularly improved UV resistance, color, color stability, cracking resistance and surface properties, without giving problems of thermal loss of the UV-absorbers, resulting in problems of plate-out, fuming, mould sweat and juicing, which all reduce the production rate in commercial applications.

What is claimed is:

1. A polycarbonate resin composition comprising a polycarbonate, a cyanacrylic acid ester compound having a molecular weight of at least 500 g/mol and a phenyl phosphite type stabilizer.

2. A polycarbonate resin composition according to claim 1 further comprising a hindered phenol type stabilizer.

3. A polycarbonate resin composition according to claim 2 further comprising a lactone type stabilizer.

4. A polycarbonate resin composition according to claim 3 consisting essentially of from 0.05 to 15 weight percent cyanacrylic acid ester type UV absorber, 20 to 1500 ppm phenyl phosphite type stabilizer, from 10 to 750 ppm hindered phenol type stabilizer and from 5 to 400 ppm lactone type stabilizer, weight percent and ppm are based on the weight of the polycarbonate.

5. A polycarbonate resin composition according to claim 3 comprising at least about 2 percent by weight cyanacrylic acid ester compound based on weight of polycarbonate.

6. A polycarbonate resin composition according to claim 3 comprising a cyanacrylic acid ester compound according to the following formula:

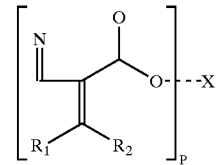

where the $R_1$ and $R_2$ substituents are each hydrogen or a radical having an iso- or heterocyclic ring system with at least one iso- or heteroaromatic nucleus, and at least one of the radicals $R_1$ or $R_2$ must be different from hydrogen; p has an average value of at least 3; X is the radical of an aliphatic or cycloaliphatic polyol having from about 3 to about 20 carbon atoms and at least p hydroxyl groups, a cycloaliphatic radical optionally containing 1 or 2 hetero atoms, and an aliphatic radical optionally being interrupted by up to 8 non-adjacent oxygen atoms, sulfur atoms, imino or $C_1$–$C_4$-alkylimino groups.

7. An article molded, shaped or otherwise fabricated from a resin composition according to claim 1.

* * * * *

UNITED STATES PATENT AND TRADEMARK OFFICE
CERTIFICATE OF CORRECTION

PATENT NO.   : 6,441,071 B1
DATED        : August 27, 2002
INVENTOR(S)  : Claude T. E. Van Nuffel It is certified that error appears in the above-identified patent and that said Letters Patent is hereby corrected as shown below:

Please replace the formula found in column 3, below line 7; top of column 4; and column 24 found in claim 6 with the formula below:

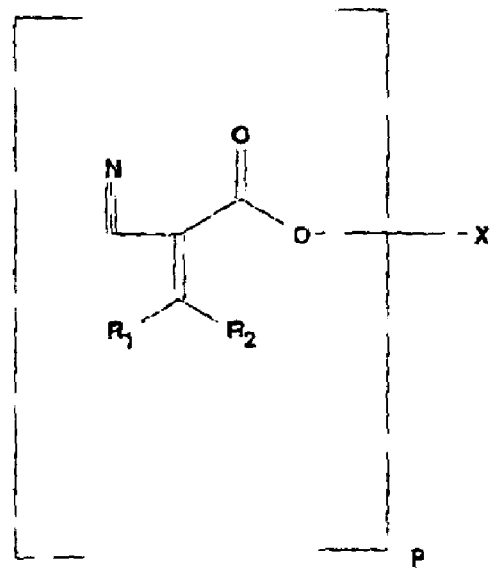

UNITED STATES PATENT AND TRADEMARK OFFICE
CERTIFICATE OF CORRECTION

PATENT NO.   : 6,441,071 B1
DATED        : August 27, 2002
INVENTOR(S)  : Claude T. E. Van Nuffel It is certified that error appears in the above-identified patent and that said Letters Patent is hereby corrected as shown below:

Please replace the formula found at the end of column 4, below line 43 with the formula below:

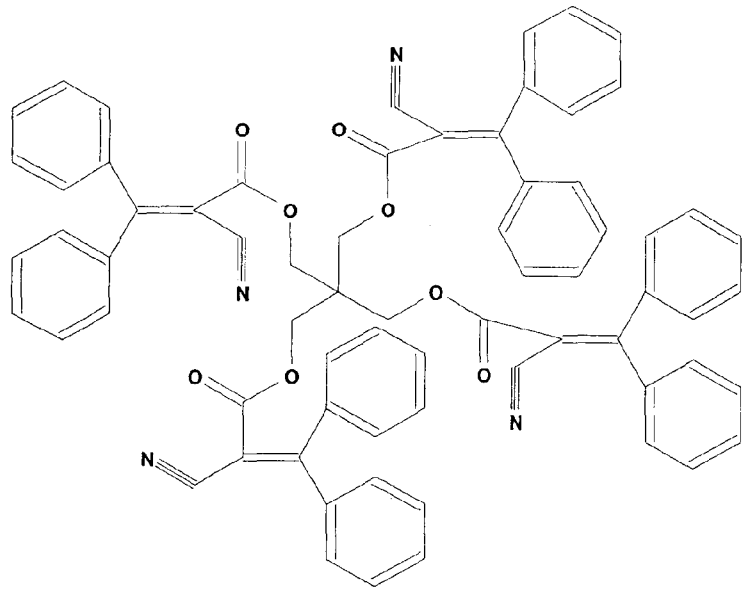

Signed and Sealed this

Thirtieth Day of September, 2003

JAMES E. ROGAN
*Director of the United States Patent and Trademark Office*